(12) United States Patent
Mercier et al.

(10) Patent No.: US 9,239,030 B2
(45) Date of Patent: Jan. 19, 2016

(54) NACELLE ELECTRICAL LOCKING SYSTEM FOR LEADING EDGE OF OPENABLE PANEL

(71) Applicant: UNITED TECHNOLOGIES CORPORATION, Hartford, CT (US)

(72) Inventors: Claude Mercier, South Windsor, CT (US); Thomas G. Cloft, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 593 days.

(21) Appl. No.: 13/622,450

(22) Filed: Sep. 19, 2012

(65) Prior Publication Data

US 2014/0075918 A1    Mar. 20, 2014

(51) Int. Cl.
| | |
|---|---|
| *F02K 3/06* | (2006.01) |
| *B64D 29/08* | (2006.01) |
| *B64D 29/00* | (2006.01) |
| *F02C 7/04* | (2006.01) |
| *F02C 7/32* | (2006.01) |
| *F01D 25/28* | (2006.01) |
| *F01D 25/24* | (2006.01) |
| *F02K 1/76* | (2006.01) |
| *F02K 1/80* | (2006.01) |

(52) U.S. Cl.
CPC . *F02K 3/06* (2013.01); *B64D 29/00* (2013.01); *B64D 29/08* (2013.01); *F01D 25/24* (2013.01); *F01D 25/243* (2013.01); *F01D 25/28* (2013.01); *F01D 25/285* (2013.01); *F02C 7/04* (2013.01); *F02C 7/32* (2013.01); *F02K 1/766* (2013.01); *F02K 1/80* (2013.01); *F05D 2230/72* (2013.01); *F05D 2240/14* (2013.01); *F05D 2260/30* (2013.01)

(58) Field of Classification Search
CPC .......... B64D 29/00; B64D 29/08; F02C 7/04; F02C 7/32; F01D 25/28; F01D 25/285; F01D 25/24; F01D 25/243; F02K 1/766; F02K 1/80
See application file for complete search history.

(56) References Cited

U.S. PATENT DOCUMENTS

| | | | | |
|---|---|---|---|---|
| 4,216,923 | A | * | 8/1980 | Harris ...................... 244/110 B |
| 4,365,775 | A | | 12/1982 | Glancy |
| 4,549,708 | A | | 10/1985 | Norris |
| 5,267,760 | A | * | 12/1993 | Carlin .............................. 292/19 |
| 5,350,136 | A | | 9/1994 | Prosser et al. |
| 7,600,371 | B2 | | 10/2009 | Sternberger |
| 7,994,940 | B2 | | 8/2011 | Grichener et al. |
| 2006/0038410 | A1 | * | 2/2006 | Pratt et al. ..................... 292/144 |
| 2011/0203293 | A1 | * | 8/2011 | Glahn ............................ 60/785 |
| 2011/0240137 | A1 | * | 10/2011 | Vauchel ....................... 137/15.2 |

* cited by examiner

*Primary Examiner* — Gerald L Sung
*Assistant Examiner* — Scott Walthour
(74) *Attorney, Agent, or Firm* — Carlson, Gaskey & Olds, P.C.

(57) ABSTRACT

A nacelle structure for a gas turbine engine includes an outer nacelle surrounding a fan section and defining an outer boundary of a bypass flow passage and an inner nacelle surrounding a core engine section and defining an inner boundary of the bypass flow passage. A panel of the inner nacelle is moveable between an open position providing access to the core engine section and a closed position. A lock is supported within the inner nacelle proximate the panel. The lock includes an electric actuator for moving a locking pin between a locked position and an unlocked position. The lock prevents opening and limits deflection of the panel when in the locked position.

14 Claims, 4 Drawing Sheets

NACELLE ELECTRICAL LOCKING SYSTEM FOR LEADING EDGE OF OPENABLE PANEL

BACKGROUND

A gas turbine engine typically includes a fan section, and a core engine including a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A nacelle structure is provided about the fan section and core engine section. The core engine section of the nacelle includes a forward edge exposed to bypass air flow. Increased pressures within the core engine nacelle can deflect openable panels outward such that bypass airflow is drawn under gaps in the panels. Bypass airflow on core nacelle panels exert loads potentially beyond those contemplated by the latching system.

Furthermore, large bypass engines can have relatively low pressure in the bypass duct, which in turn reduces forces pushing the core engine nacelle towards the engine. The increased pressure differentials between the core engine compartment and the bypass duct can contribute to a larger outward deflection or formation of gaps in the core engine nacelle. Large fan bypass ratios may reduce pressure in the bypass duct that in turn reduces the pressure aiding in holding the core engine nacelle in place. The reduced differential pressures across the core engine nacelle can generate a bias toward outward deflections of core engine nacelle panels compared with previous gas turbine engine configurations.

Additional mechanically actuated locks can be utilized to prevent the formation of gaps. Mechanically actuated locking devices use mechanical linkages that run from the core engine to the outer fan case and nacelle structure. Mechanical linkages extending between the core engine and the fan case add weight and complexity.

Accordingly, it is desirable to design and develop locking devices for the core engine nacelle section that reduce complexity while maintaining panel position during engine operation.

SUMMARY

A nacelle structure for a gas turbine engine according to an exemplary embodiment of this disclosure, among other possible things includes an outer nacelle surrounding a fan section and defining an outer boundary of a bypass flow passage, an inner nacelle surrounding a core engine section and defining an inner boundary of the bypass flow passage, a panel of the inner nacelle moveable between an open position providing access to the core engine section and a closed position, and a lock supported within the inner nacelle proximate the panel, the lock including an electric actuator for moving a locking pin between a locked position preventing opening of the panel and an unlocked position.

In a further embodiment of the foregoing nacelle structure, a blocker is mounted to a fixed structure of the core engine section blocking movement of the pin when the lock is in the locked position.

In a further embodiment of any of the foregoing nacelle structures, the electric actuator comprises a solenoid for moving the pin between the locked and unlocked positions.

In a further embodiment of any of the foregoing nacelle structures, the electric actuator comprises an electric motor for moving the pin between the locked and unlocked positions.

In a further embodiment of any of the foregoing nacelle structures, a wire harness is provided for communicating control signals to the lock. The wire harness extends through a structure extending radially between the inner nacelle and the outer nacelle.

In a further embodiment of any of the foregoing nacelle structures, a switch is mounted remote of the lock within the outer nacelle.

In a further embodiment of any of the foregoing nacelle structures, the switch prevents closure of a cowling when in an unlocked position.

In a further embodiment of any of the foregoing nacelle structures, a manual override is provided for moving the locking pin from a locked position to an unlocked position without operating the electric actuator.

A gas turbine engine according to an exemplary embodiment of this disclosure, among other possible things includes a fan including a plurality of fan blades rotatable about an axis. A core engine section includes a compressor section, a combustor in fluid communication with the compressor section, and a turbine section in fluid communication with the combustor. A geared architecture is driven by the turbine section for rotating the fan about the axis. An outer nacelle surrounds a fan section and defines an outer boundary of a bypass flow passage. An inner nacelle surrounds a core engine section and defines an inner boundary of the bypass flow passage. A panel of the inner nacelle moveable between an open position provides access to the core engine section and a closed position. A lock is supported within the inner nacelle proximate the panel. The lock includes an electric actuator for moving a locking pin between a locked position preventing opening of the panel and an unlocked position.

In a further embodiment of the foregoing gas turbine engine, a blocker is mounted to a fixed structure of the engine core blocking movement of the pin in a radial direction when the lock is in the locked position.

In a further embodiment of any of the foregoing gas turbine engines, the electric actuator comprises a solenoid for moving the pin between the locked and unlocked positions.

In a further embodiment of any of the foregoing gas turbine engines, the electric actuator comprises an electric motor for moving the pin between the locked and unlocked positions.

In a further embodiment of any of the foregoing gas turbine engines, a wire harness is provided for communicating control signals to the lock. The wire harness extends through a structure extending radially between the inner nacelle and the outer nacelle.

In a further embodiment of any of the foregoing gas turbine engines, a switch is mounted remote of the lock within the outer nacelle.

In a further embodiment of any of the foregoing gas turbine engines, the switch prevents closure of a cowling when in an unlocked position.

In a further embodiment of any of the foregoing gas turbine engines, includes a manual override is provided for moving the locking pin from a locked position to an unlocked position without operating the electric actuator.

A method of latching a panel of a nacelle according to an exemplary embodiment of this disclosure, among other possible things includes mounting a lock within a nacelle proximate an openable panel. The lock includes an electric actuator for moving a locking pin between a locked position preventing opening of a panel and an unlocked position, routing a wire harness to the lock for supplying electrical energy for the electric actuator and for controlling operation of the electric actuator and actuating the lock for moving the locking pin to the unlocked position and allow opening of the panel.

In a further embodiment of the foregoing method, movement of the openable panel is limited relative to the nacelle with the locking pin in the locked position.

In a further embodiment of any of the foregoing methods, a manual override is operable for moving the locking pin from the locked position to the unlocked position without operating the electric actuator.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
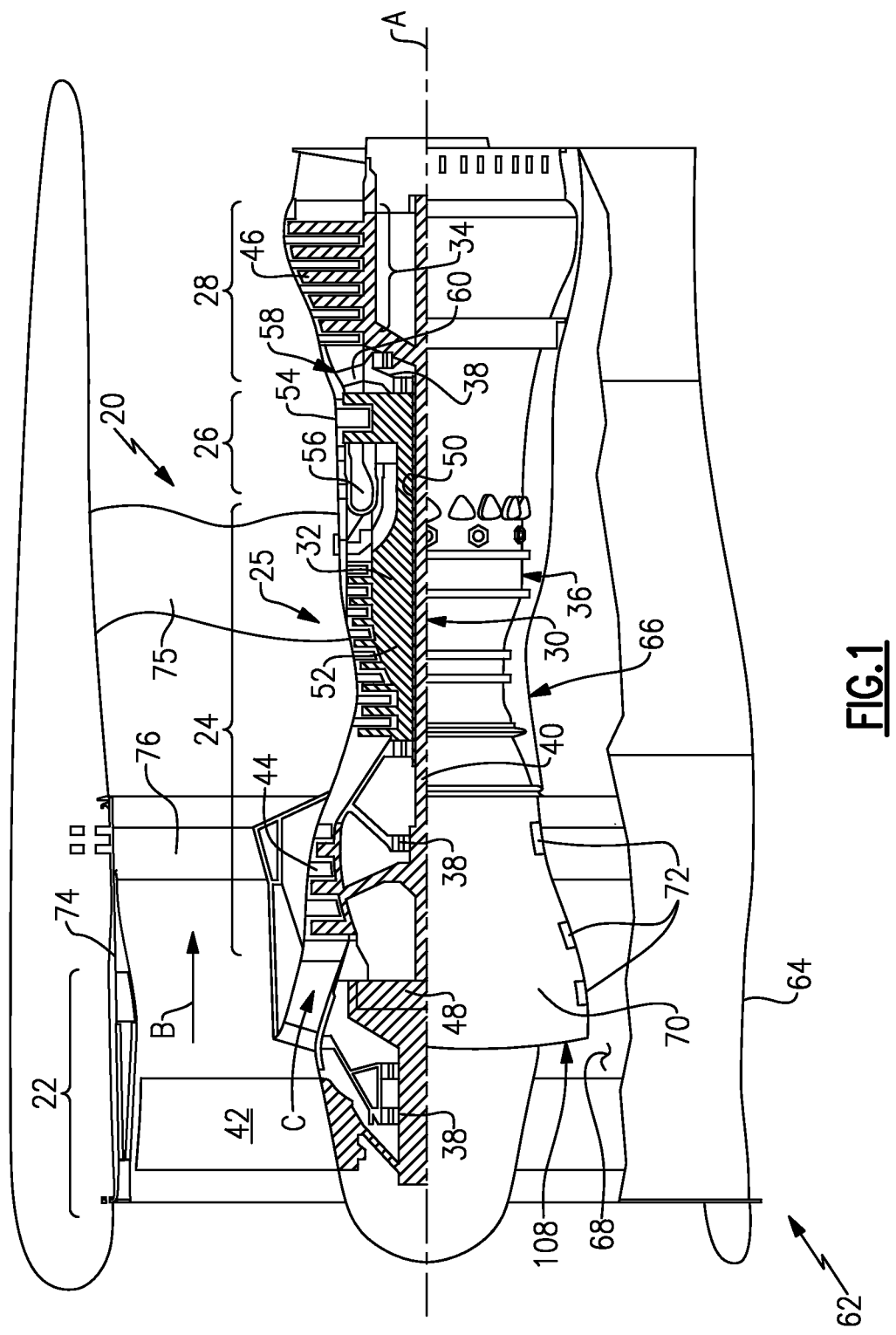
FIG. 1 is a schematic view of an example gas turbine engine.

FIG. 1 schematically illustrates an example gas turbine engine 20 that includes a fan section 22, and an engine core 25 including a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A nacelle 62 is disposed about the gas turbine engine 20 and includes an outer nacelle 64 and a core nacelle 66. The core nacelle 66 is disposed about the core engine 25 and includes an inner fixed structure 70 that is openable to allow access to the components of the core engine 25. The inner fixed structure 70 is held in a closed position by a series of latches 72 at the bottom of the nacelle (often referred to as the latch beam) where the two nacelle halves come together. The latches 72 are accessible by mechanics from the outside of the nacelle 62.

Air pressure within the core nacelle 66 can be greater than a surrounding pressure within the bypass passage 68 disposed about the core engine nacelle 66. This difference in pressure can result in forward edge 108 of the inner fixed structure 70 being forced outward. This outward movement of the inter-fixed structure 70 can produce a gap or opening between the openable panel 70 and the fixed structures. High speed air through the bypass passage 68 may then enter the gap and further contribute to the increases in pressure within the core engine nacelle 66. The high speed air interaction with the outwardly displaced inner fixed structure 70 can introduce greater than desired axial forces. Moreover, once the bypass air begins or is communicated under the inner fixed structure 70, loads produced by the airflow and increased pressures could exert high loads on the latches 72 beyond the normal intended loads.

Figure 3:
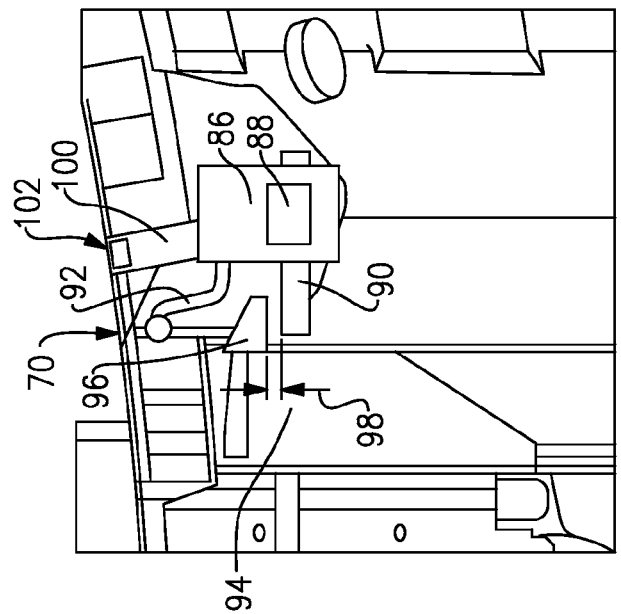
FIG. 3 is a schematic view of an example locking system.
Figure 2:
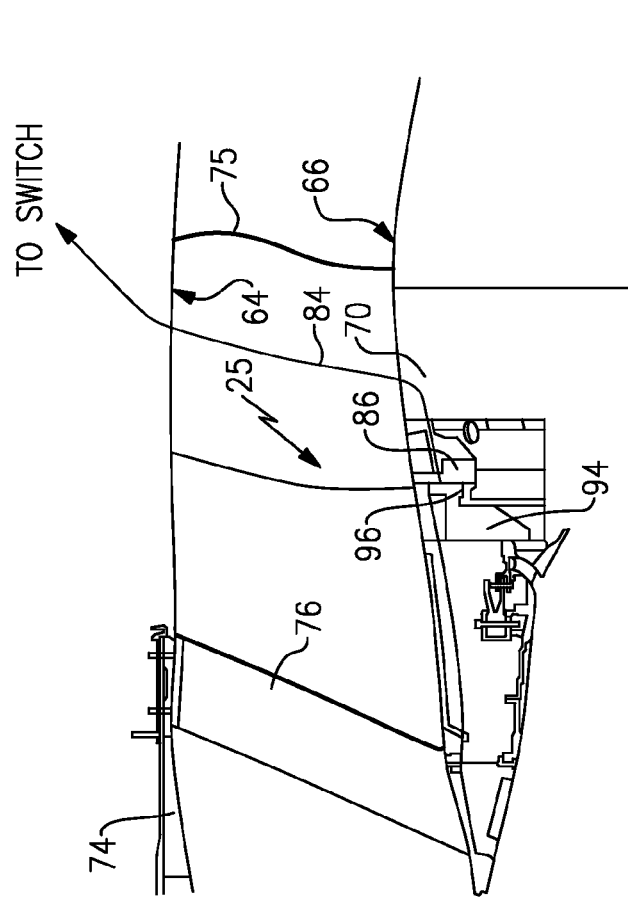
FIG. 2 is a schematic view of a forward portion of the example gas turbine engine.

Referring to FIGS. 2 and 3, the example core nacelle structure 66 includes a lock 86 that corresponds with a blocker 96 to prevent outward movement of the inner fixed structure 70. As appreciated, the inner fixed structure 70 is a panel that is openable to allow access to the core engine 25 for maintenance purposes. In typical operation, the latches 72 are unlatched and the lock 86 is moved to an unlocked position (FIG. 6) to allow opening of the inter-fixed structure 70.

The example lock 86 includes an electric actuator 88 that is powered through a wiring harness 92. The electric actuator 88 moves a pin 90 from a locked position illustrated in FIG. 3 to an open position or unlocked position illustrated in FIG. 6. The pin 90 is spaced apart from the blocker 96 to define a gap 98. A gap 98 provides for the assembly of the nacelle structure 66 and also provides tolerance for assembly maintenance. The lock 86 does not provide the latching function provided by the latches 72. Instead, the lock 86 is a secondary feature that prevents opening of the inner fixed structure 70 in response to increased loads and pressure.

The example lock 86 includes an electrical actuator 88. In one example, the electrical actuator 88 comprises a solenoid 90 actuateable between the open and closed positions. In another disclosed embodiment, the actuator 88 comprises an electric motor to move the pin 90 between the open and closed position. As appreciated, any electrical actuator as is known may be utilized for the example lock 86 to move the pin 90 between the open and closed position.

Electrical energy and control of the lock 86 is provided through the wiring harness 92. The wiring harness 92 corresponds with a wire 84 that is threaded through the core nacelle 66 and out to the fan case 74. In this example, a wire 84 is in communication with the wiring harness 96 and is threaded through a bifurcation 75. As appreciated, although in the disclosed example embodiment, the wire 84 is threaded through the bifurcation 75, the wire 84 could be threaded through other nacelle structures such as the fan exit guide vane 76 that extends between the fan case 74 and the core nacelle 66. Use of an electrical actuator 88 for the lock 86 allows for alternate routings of the wire 84 and wire harness 92.

Figure 5:
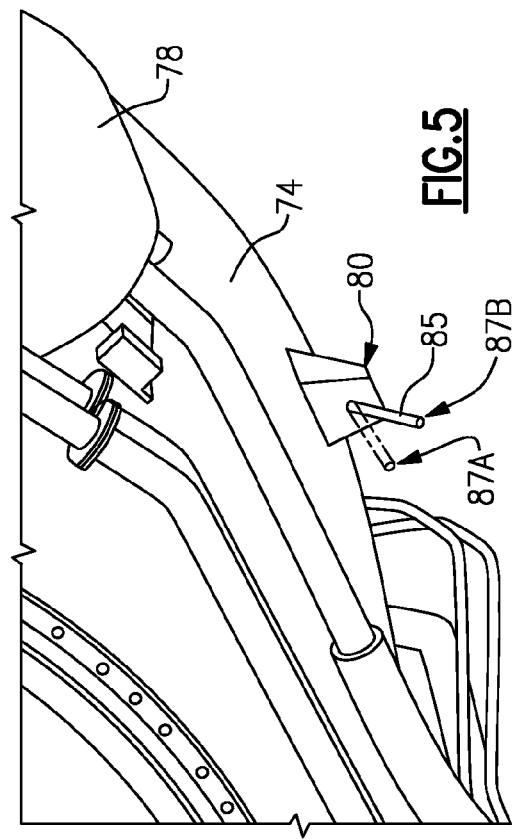
FIG. 5 is an enlarged view of an example actuation switch.
Figure 4:
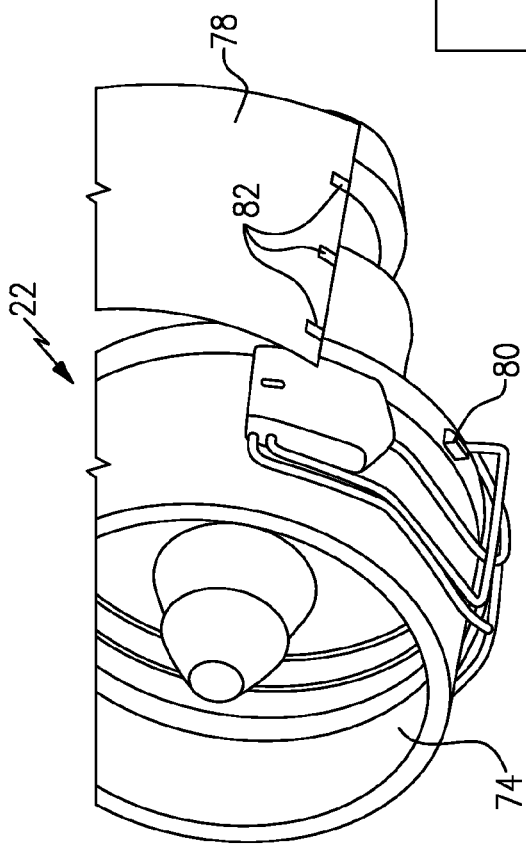
FIG. 4 is a schematic view of a fan cowl and actuation switch.

Referring to FIGS. 4 and 5 with continued reference to FIG. 3, the example lock 86 is actuated by a switch 80 disposed on an outer surface of the fan case 74. The fan case 74 is enclosed by a cowling 78 that is part of the outer nacelle 64. The fan cowling 78 includes latches 82 that maintain the cowling 78 in a closed position. The switch 80 includes a lever 85 movable between a locked position indicated at 87A and an unlocked position indicated at 87B. The lever 85 extends from the switch 80 in the unlocked position 87b such that it does not allow closing of the cowling 78. This feature provides a failsafe mechanism to ensure that the lock 86 is within a locked position when the fan cowling 78 and outer nacelle structure 62 is reinstalled to the gas turbine engine.

Figure 6:
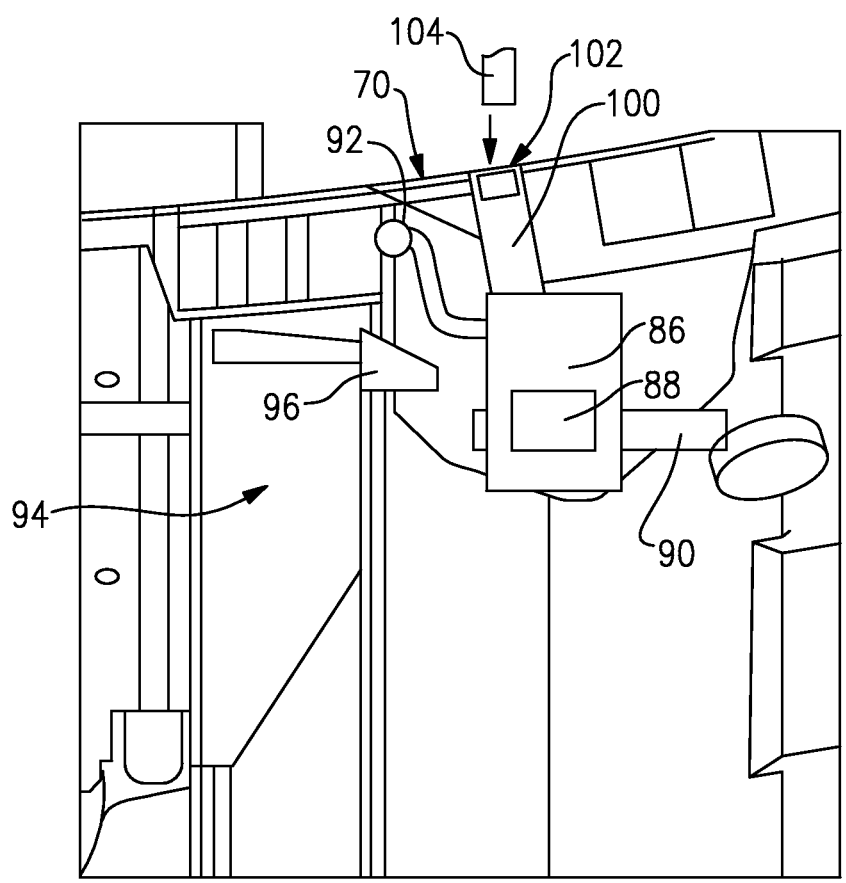
FIG. 6 is a schematic view of the example locking mechanism in an opened position.

Referring to FIG. 6 with continued reference to FIG. 3, the lock 86 is shown in an open position to allow opening and maintenance of the inner fixed structure 70. In the open position, the pin 90 is moved away from the blocker 96 to allow movement past the blocker 96 and thereby opening of the inner fixed structure 70.

In this example the blocker 96 is attached through bracket 94 to a fixed structure about the case of the core engine 25. The pin 90 could also interface with any fixed structure provided within the core nacelle 66 to provide the locking function that prevents opening of the inner fixed structure 70 during operation.

The example lock 86 includes a manual override feature 100 that allows for opening of the pin 90 should electrical contact and control through the wire harnesses 92 and wire 84 fail. In this example, the override 100 comprises a rotatable member that engages the pin 90 to move the pin 90 to the closed position. In one example, the manual override 100 includes one portion of a worm gear assembly engaged with corresponding gear teeth on the pin 90. A tool 104 engages a tool engagement surface 102 to facilitate rotation of the manual override 100 and thereby movement of the pin 90 to the unlocked position illustrated in FIG. 6.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A nacelle structure for a gas turbine engine comprising:
   an outer nacelle surrounding a fan section and defining an outer boundary of a bypass flow passage;
   an inner nacelle surrounding a core engine section and defining an inner boundary of the bypass flow passage;
   a panel of the inner nacelle moveable between an open position providing access to the core engine section and a closed position;
   a lock supported within the inner nacelle proximate the panel, the lock including an electric actuator for moving a locking pin between a locked position preventing opening of the panel and an unlocked position;
   a blocker mounted to a fixed structure of the core engine section blocking movement of the locking pin when the locking pin is in the locked position, wherein the locking pin is spaced radially apart from the blocker when in the locked position; and
   a series of latches providing a latching function for holding the panel in the closed position;
   wherein operation of the lock is independent of the latching function.

2. The nacelle structure as recited in claim 1, wherein the electric actuator comprises a solenoid for moving the pin between the locked and unlocked positions.

3. The nacelle structure as recited in claim 1, wherein the electric actuator comprises an electric motor for moving the pin between the locked and unlocked positions.

4. The nacelle structure as recited in claim 1, including a wire harness including a wire for communicating control signals to the lock, the wire extending through a structure extending radially between the inner nacelle and the outer nacelle.

5. The nacelle structure as recited in claim 4, including a switch mounted remotely from the lock within the outer nacelle.

6. The nacelle structure as recited in claim 5, wherein the switch comprises a lever which prevents closure of a cowling when the lever is in an unlocked position.

7. The nacelle structure as recited in claim 1, including a manual override for moving the locking pin from the locked position to the unlocked position without operating the electric actuator.

8. A gas turbine engine comprising:
   a fan including a plurality of fan blades rotatable about an axis;
   a core engine section including a compressor section, a combustor in fluid communication with the compressor section, and a turbine section in fluid communication with the combustor;
   a geared architecture driven by the turbine section for rotating the fan about the axis;
   an outer nacelle surrounding a fan section and defining an outer boundary of a bypass flow passage;
   an inner nacelle surrounding the core engine section and defining an inner boundary of the bypass flow passage;
   a panel of the inner nacelle moveable between an open position providing access to the core engine section and a closed position;
   a lock supported within the inner nacelle proximate the panel, the lock including an electric actuator for moving a locking pin between a locked position preventing opening of the panel and an unlocked position;
   a blocker mounted to a fixed structure of the core engine section blocking movement of the locking pin in a radial direction when the locking pin is in the locked position, wherein the locking pin is spaced apart from the blocker when the locking pin is in the locked position; and
   a series of latches providing a latching function for holding the panel in the closed position;
   wherein operation of the lock is independent of the latching function.

9. The gas turbine engine as recited in claim 8, wherein the electric actuator comprises a solenoid for moving the locking pin between the locked and unlocked positions.

10. The gas turbine engine as recited in claim 8, wherein the electric actuator comprises an electric motor for moving the locking pin between the locked and unlocked positions.

11. The gas turbine engine as recited in claim 8, including a wire harness including a wire for communicating control signals to the lock, the wire extending through a structure extending radially between the inner nacelle and the outer nacelle.

12. The gas turbine engine as recited in claim 11, including a switch mounted remotely from the lock within the outer nacelle.

13. The gas turbine engine as recited in claim 12, wherein the switch comprises a lever which prevents closure of a cowling when the lever is in an unlocked position.

14. The gas turbine engine as recited in claim 8, including a manual override for moving the locking pin from the locked position to the unlocked position without operating the electric actuator.

* * * * *